US010677978B2

(12) United States Patent
Lee et al.

(10) Patent No.: US 10,677,978 B2
(45) Date of Patent: Jun. 9, 2020

(54) DISPLAY DEVICE

(71) Applicant: SAMSUNG ELECTRONICS CO., LTD., Suwon-si (KR)

(72) Inventors: Kil-hong Lee, Suwon-si (KR); Dae-young Kim, Suwon-si (KR); Hyung-ki Kim, Anyang-si (KR); Yong-sung Yoo, Suwon-si (KR); Duk-jin Jeon, Bucheon-si (KR); Tae-hee Jeon, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/115,019

(22) Filed: Aug. 28, 2018

(65) Prior Publication Data
US 2019/0121011 A1    Apr. 25, 2019

(30) Foreign Application Priority Data
Oct. 19, 2017   (KR) .......................... 10-2017-0135785

(51) Int. Cl.
*F21V 8/00* (2006.01)
*G02B 6/42* (2006.01)

(52) U.S. Cl.
CPC ......... G02B 6/0021 (2013.01); G02B 6/0025 (2013.01); G02B 6/0031 (2013.01);
(Continued)

(58) Field of Classification Search
CPC .. G02B 6/0021; G02B 6/0031; G02B 6/4256; G02B 6/0068; G02B 6/0025; G02B 6/0055; G02B 6/0073; G02B 6/0091
See application file for complete search history.

(56) References Cited

U.S. PATENT DOCUMENTS 7,924,364 B2 * 4/2011 Park ................. G02F 1/133308
349/113
2008/0074580 A1 * 3/2008 Chang ................ G02B 6/0068
349/65
(Continued)

FOREIGN PATENT DOCUMENTS

JP          3337112 B2      10/2002
JP       2014029798 A  *    2/2014
(Continued)

OTHER PUBLICATIONS

International Search Report (PCT/ISA/210) dated Oct. 31, 2018, issued by the International Searching Authority in counterpart International Patent Application No. PCT/KR2018/009632.
(Continued)

*Primary Examiner* — Anh T Mai
*Assistant Examiner* — Glenn D Zimmerman
(74) *Attorney, Agent, or Firm* — Sughrue Mion, PLLC

(57) ABSTRACT

A display device is provided, which includes a display panel, a light guide plate disposed in a rear of the display panel, a light source disposed adjacent to a light-incident surface of the light guide plate and configured to radiate light toward the light-incident surface of the light guide plate, and a holder disposed along a light-facing surface of the light guide plate, the light-facing surface of the light guide plate opposing the light-incident surface of the light guide plate, the holder including a supporting portion that supports a light-emitting surface of the light guide plate, the light-emitting surface of the light guide plate disposed between the light-incident surface and the light-facing surface, wherein the supporting portion of the holder has a first light reflecting surface that faces the light-facing surface of the light guide plate.

18 Claims, 5 Drawing Sheets

(52) U.S. Cl.
CPC ......... *G02B 6/0055* (2013.01); *G02B 6/0068* (2013.01); *G02B 6/0073* (2013.01); *G02B 6/0091* (2013.01); *G02B 6/4256* (2013.01)

(56) References Cited

U.S. PATENT DOCUMENTS

| | | | |
|---|---|---|---|
| 2012/0039087 A1* | 2/2012 | Lee | G02B 6/0055 362/606 |
| 2012/0050634 A1* | 3/2012 | Kim | G02F 1/1333 349/58 |
| 2014/0168949 A1 | 6/2014 | Zhao et al. | |
| 2014/0247398 A1* | 9/2014 | Kakimoto | G02B 6/0055 348/729 |
| 2015/0078032 A1 | 3/2015 | Horiguchi et al. | |
| 2015/0170582 A1* | 6/2015 | Shimizu | G02F 1/133308 345/206 |
| 2015/0185395 A1 | 7/2015 | Chang | |
| 2015/0219832 A1 | 8/2015 | Baek et al. | |
| 2016/0116658 A1* | 4/2016 | Chen | G02B 6/002 362/611 |
| 2016/0131830 A1 | 5/2016 | Gettemy et al. | |
| 2016/0223739 A1 | 8/2016 | Yoon et al. | |
| 2017/0003434 A1* | 1/2017 | Yang | G02B 6/0045 |
| 2018/0373097 A1* | 12/2018 | Kurata | G02B 6/003 |

FOREIGN PATENT DOCUMENTS

| | | |
|---|---|---|
| KR | 10-2012-0008879 A | 2/2012 |
| KR | 10-2012-0130467 A | 12/2012 |
| KR | 10-1373235 B1 | 3/2014 |
| KR | 10-2015-0092797 A | 8/2015 |
| KR | 10-1633105 B1 | 6/2016 |

OTHER PUBLICATIONS

Writtent Opinion (PCT/ISA/237) dated Oct. 31, 2018, issued by the International Searching Authority in counterpart International Patent Application No. PCT/KR2018/009632.

* cited by examiner

DISPLAY DEVICE

CROSS-REFERENCE TO RELATED APPLICATION

This application claims priority under 35 U.S.C. § 119 to Korean Patent Application No. 10-2017-0135785 filed on Oct. 19, 2017, in the Korean Intellectual Property Office, the disclosure of which is incorporated herein by reference in its entirety.

BACKGROUND

Field

The present disclosure relates to a display device, and more particularly, to a display device, in which a light source is disposed along an edge of a light guide plate and a display panel is disposed in front of the light guide plate to be spaced apart from the light guide plate for an optical distance.

Description of Related Art

Since a liquid crystal display (LCD) that is given the greatest deal of weight in the current display market is of a non-luminous type, a backlight unit is used therein.

Such a backlight unit is briefly divided into a direct-type backlight unit in which a light source is disposed in the rear of a light guide plate and an edge-type backlight unit in which a light source is disposed along an edge of a light guide plate.

In case of the edge-type backlight unit, only light emitted from a front surface (or light-emitting surface) of the light guide plate is used, and thus the light guide plate is designed to have a size that is equal to or larger than the size of a display panel. Further, the light guide plate applied to the edge-type backlight emits light from a light-emitting surface of the light guide plate by reflecting and scattering the light emitted from a plurality of LEDs disposed along a light-incident part of the light guide plate. Further, a reflective sheet disposed on the rear surface of the light guide plate changes the direction of the light incident upon the rear surface of the light guide plate toward the light-emitting surface. The light emitted to the light-emitting surface of the light guide plate is collected through optical films disposed in front of the light-emitting surface, and then is provided to the display panel.

As described above, the light guide plate serves to uniformly distribute light on a screen by changing the direction of the light incident to the inside of the light guide plate via the light-incident part toward the display panel.

On the other hand, the light guide plate used in the edge-type backlight has a light-reflecting side tape attached to a light-facing part of the light guide plate that is located on an opposite side of the light-incident part of the light guide plate to improve light efficiency.

However, if such a side tape is applied, material expenses and personnel expenses required to attach the side tape in an assembling process may be increased.

Further, due to heat generated inside the display device when the display device operates, adhesives that are spread on one surface of the side tape in order to attach the side tape onto the light-facing part of the light guide plate may melt.

In this case, since the light-facing part of the light guide plate is normally located on an upper side of the light-incident part of the light guide plate, part of the melted adhesives may flow down along the light guide plate to form spots on the light guide plate, and due to this, luminance of the light emitted from an area corresponding to the spotted portion may appear different from the luminance of the light emitted from other non-spotted portions of the light guide plate. As a result, such a luminance difference is visually recognized on the screen, and thus the brightness of the screen may not be uniform.

SUMMARY

Embodiments of the present disclosure overcome the above disadvantages and other disadvantages not described above, and provide a display device, which has a reflection structure formed on a part of a holder corresponding to a light-facing part of a light guide plate to perform the same function as the function of an existing side tape, and thus can omit the side tape.

Further, embodiments of the present disclosure provide a display device, which can block light from leaking through a gap formed between a holder disposed on the side of a light-incident part of a light guide plate and the light guide plate, and thus can improve light efficiency.

In accordance with an aspect of the present disclosure, a display device may include a display panel; a light guide plate disposed in rear of the display panel to be spaced apart from the display panel and having a smaller size than the size of the display panel; a light source disposed adjacent to a light-incident part of the light guide plate and configured to radiate light toward the light-incident part; and a holder disposed along a light-facing part of the light guide plate located on an opposite side of the light-incident part of the light guide plate and provided with a first portion supporting a light-emitting surface of the light guide plate, wherein the first portion of the holder has a first light reflecting surface formed on a bottom portion of the first portion of the holder to face the light-facing part.

The first portion of the holder may further include a second light reflecting surface extending from the first light reflecting surface to face a front surface of the light guide plate.

The display device may further include a reflective sheet disposed in rear of the light guide plate, wherein the reflective sheet includes an extension part integrally formed with the reflective sheet and configured to project farther than the light-facing part of the light guide plate and to correspond to the second light reflecting surface.

The first portion of the holder may be made of a light reflective material.

The first portion of the holder may have a first light guide surface formed on an upper surface of the first portion and configured to be inclined from the light guide plate side to the display panel side to guide light emitted from a front surface of the light guide plate to the display panel side.

The holder may further include a second portion disposed along the light-incident part of the light guide plate and configured to support a front surface of the light guide plate, wherein the second portion of the holder includes a light blocking protrusion formed on a bottom portion of the second portion and configured to come in close contact with the front surface of the light guide plate.

The light blocking protrusion may have a convexly curved portion formed thereon to come in close contact with the front surface of the light guide plate.

The second portion of the holder may be made of a material having elasticity. Further, the second portion of the holder may be made of a light reflective material.

The second portion of the holder may have a second light guide surface formed on an upper surface of the second portion and configured to be inclined from the light guide plate side to the display panel side to guide light emitted from a front surface of the light guide plate to the display panel side.

In accordance with another aspect of the present disclosure, a display device may include a display panel; a light guide plate disposed in a rear of the display panel to be spaced apart from the display panel and having a smaller size than a size of the display panel; a light source disposed adjacent to a light-incident surface of the light guide plate and configured to radiate light toward the light-incident surface of the light guide plate; and a holder disposed along a light-facing surface of the light guide plate, the light-facing surface of the light guide plate opposing the light-incident surface of the light guide plate, the holder comprising a supporting portion that supports a light-emitting surface of the light guide plate, the light-emitting surface of the light guide plate disposed between the light-incident surface and the light-facing surface. The supporting portion of the holder may include a first light reflecting surface that faces the light-facing surface of the light guide plate.

The supporting portion of the holder may further include a second light reflecting surface that faces the light-emitting surface of the light guide plate.

The display device may further include a reflective sheet disposed in rear of the light guide plate. The reflective sheet may be configured to reflect light exiting the light-facing surface of the light guide plate.

The supporting portion of the holder may be made of a light reflective material.

The first portion of the holder may include a first light guide surface formed on a front surface of the first portion and configured to be inclined from a side facing the light guide plate to a side facing the display panel to guide light emitted from a front surface of the light guide plate toward the display panel.

The holder may further include a second portion disposed along the light-incident part of the light guide plate and configured to support a light-emitting surface of the light guide plate. The second supporting portion of the holder may include a light blocking protrusion formed on a rear portion of the second supporting portion, the light blocking protrusion being configured to contact the light-emitting surface of the light guide plate.

The light blocking protrusion may include a convexly curved portion formed thereon to contact the light-emitting surface of the light guide plate.

The second supporting portion of the holder may be made of a material having elasticity.

The second supporting portion of the holder may be made of a light reflective material.

The second supporting portion of the holder may include a second light guide surface formed on a front surface of the second portion and configured to be inclined from a side facing the light guide plate to a side facing the display panel to guide light emitted from the light-emitting surface of the light guide plate toward the display panel.

A surface of the light blocking protrusion may be made of a light reflective material.

In accordance with still another aspect of the present disclosure, a display device may include a display panel; a light guide plate; a reflecting sheet provided behind the light guide plate; and a frame configured to support a front surface of the light guide plate. The frame may include a first reflective surface opposing a side surface of the light guide plate and a second reflective surface opposing the reflecting sheet. Light exiting the side surface of the light guide plate may be reflected by the reflecting sheet, the first reflective surface, and the second reflective surface and may reenter the light guide plate at the side surface.

The first reflective surface may be parallel to the side surface of the light guide plate. The second reflective surface may be parallel to the front surface of the light guide plate.

The second reflective surface may contact the front surface of the light guide plate.

A gap may be formed between the side surface of the light guide plate and the first reflective surface. The reflective sheet may oppose the second reflective surface across the gap.

The display device may further include a display panel in front of the light guide plate. Light exiting the front surface of the light guide plate may be incident upon the display panel.

The display device may further include a light source configured to emit light toward a second side surface of the light guide plate, the second side surface opposing the side surface.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects, features, and advantages of certain embodiments of the present disclosure will be more apparent from the following description taken in conjunction with the accompanying drawings, in which.

DETAILED DESCRIPTION

For full understanding of the configuration and effects of the present disclosure, embodiments of the present disclosure will be described with reference to the accompanying drawings. However, the present disclosure is not limited to embodiments disclosed hereinafter, but may be implemented in several types, and various modifications may be made. The following description with reference to the accompanying drawings is provided to assist those of ordinary skill in the art to comprehensively understand the technical features of the present disclosure. In order to help understanding of the present disclosure, sizes of some constituent elements illustrated in the accompanying drawings may be exaggerated or reduced for clarity in explanation.

The terms "first, second, and so forth" may be used to describe various elements, but should not be limited to the corresponding terms. The above-described terms may be used only for the purpose of discriminating one constituent element from another constituent element without limiting the constituent elements. For example, without departing from the scope of the present disclosure, the first element may be called the second element, and the second element may be called the first element in a similar manner.

In the description, a singular expression may include a plural expression unless clearly differently expressed on the context. The term "includes" or "has" used in the description represents that features, figures, steps, operations, constituent elements, components, or combinations thereof exist, and thus the term should be understood that one or more other features, figures, operations, constituent elements, components, or combinations thereof may be added thereto.

Unless differently defined, the terms used in embodiments of the present disclosure may be analyzed as meanings generally known to those of ordinary skill in the art to which the present disclosure pertains.

Hereinafter, with reference to the drawings, the structure of a display device according to an embodiment of the present disclosure will be described in detail.

Figure 1:
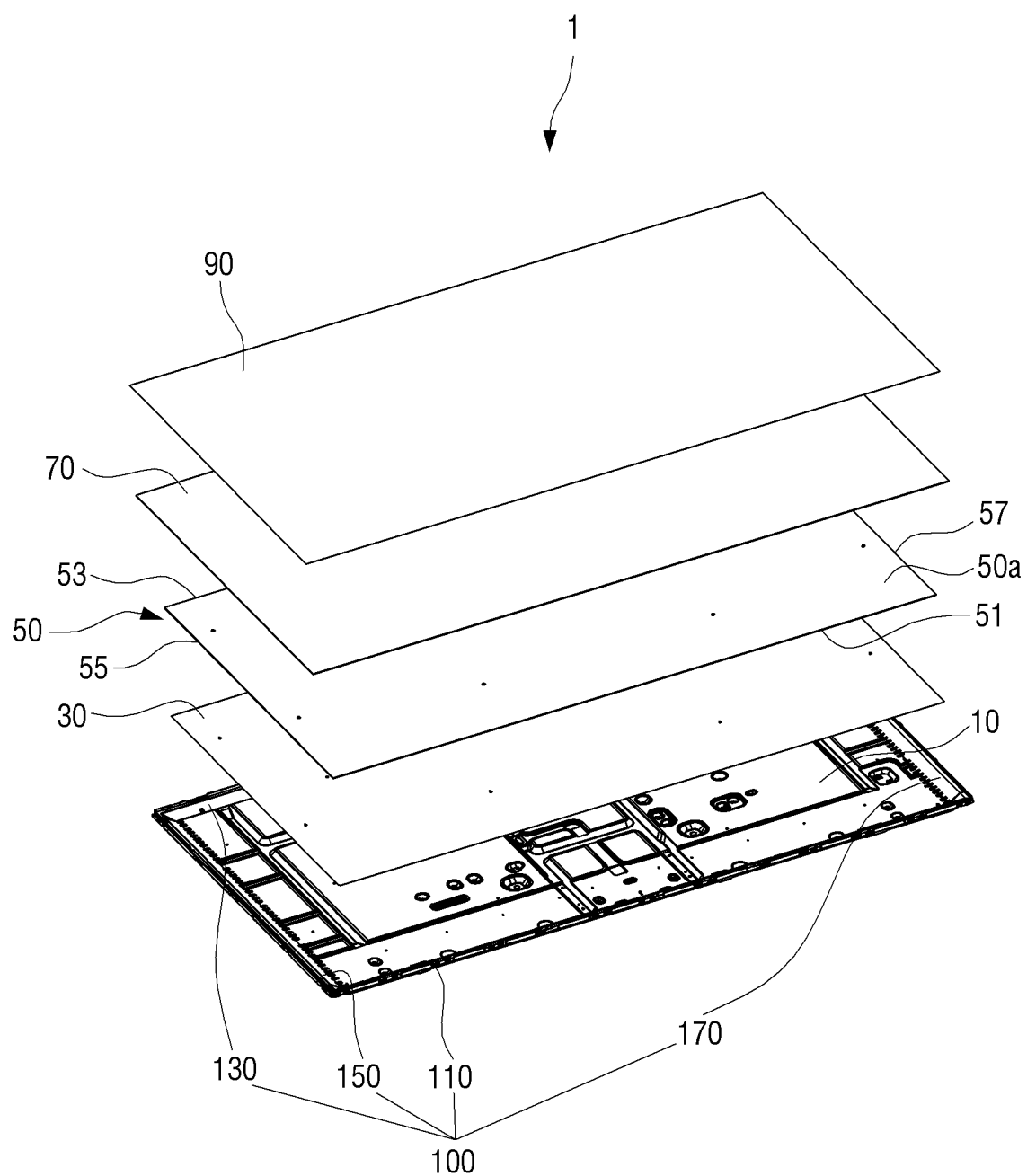
FIG. 1 is an exploded perspective view of a display device according to an embodiment of the present disclosure.
Figure 2:
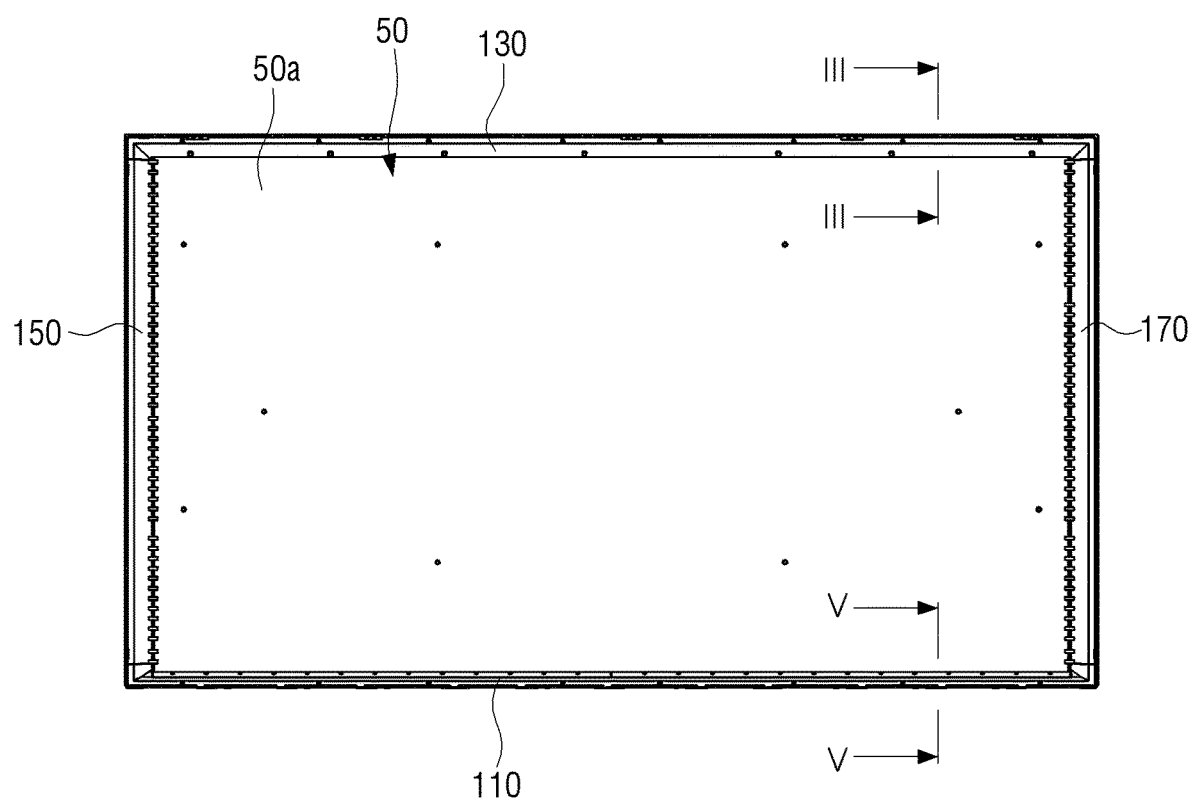
FIG. 2 is a front view of a display device in a state where a diffusion sheet and a display panel have been removed therefrom.

FIG. 1 is an exploded perspective view of a display device according to an embodiment of the present disclosure, and FIG. 2 is a front view of a display device in a state where a diffusion sheet and a display panel have been removed therefrom.

Referring to FIGS. 1 and 2, a display device 1 according to an embodiment of the present disclosure may include a back chassis 10 for giving stiffness to the display device, a light guide plate 50 disposed in front of the back chassis to emit light from a front surface thereof (hereinafter, light-emitting surface 50a) toward a display panel, a light module 60 (see FIG. 5) disposed along one side surface (hereinafter, light-incident part 51) of the light guide plate to radiate light to the light-incident part 51 of the light guide plate, a display panel 90 disposed in front of the light guide plate 50 spaced apart from the light guide plate to maintain an optical distance, and a holder (i.e., a frame) 100 simultaneously supporting borders of the light guide plate 50 and the display panel 90.

Further, the display device 1 may include a reflective sheet 30 disposed in the rear of the light guide plate 50 to reflect light emitted from the rear surface of the light guide plate 50 toward the light guide plate 50 again, and a diffusion plate 70 disposed on the rear surface of the display panel 90 to diffuse the light emitted from the light-emitting surface 50a of the light guide plate 50.

Although not illustrated in the drawing, the display device 1 may include a prism sheet and a protection sheet disposed to be laminated between the diffusion plate 70 and the display panel 90. Further, although not illustrated in the drawing, a plurality of support members may be disposed between the light guide plate 50 and the diffusion plate 70 to maintain a specific spacing for an optical distance between the light guide plate 50 and the diffusion plate 70. The plurality of support members may be fixed to the light guide plate 50.

The light guide plate 50 guides most light, which is incident from a plurality of LEDs 63 (see FIG. 5) to an inside of the light guide plate through the light-incident part 51, to the light-emitting surface 50a of the light guide plate through reflection and scattering in the light guide plate 50.

Figure 3:
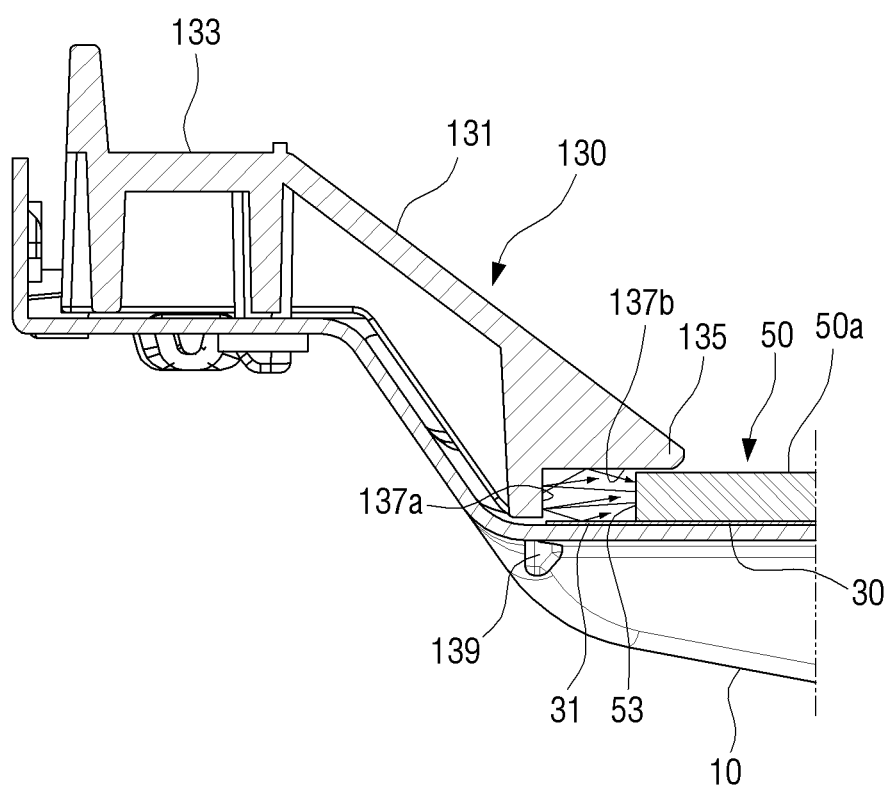
FIG. 3 is a partially cut-away cross-sectional view illustrating an example in which light emitted from a light-incident part of a light guide plate is reflected from first and second reflecting surfaces formed on a bottom portion of an upper-side member and then is again incident to the light-incident part of the light guide plate.
Figure 4:
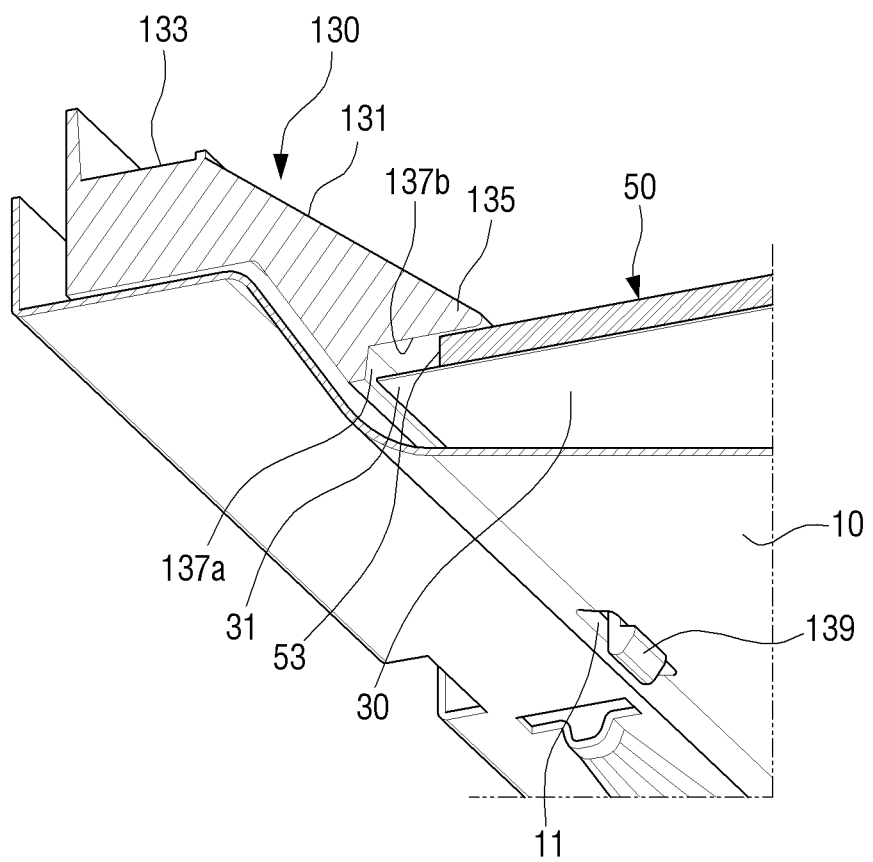
FIG. 4 is a partially cut-away perspective view illustrating an example in which an upper-side member is hook-coupled to a back chassis.

The light guide plate 50 includes a light-facing part (i.e., a side surface) 53 formed on an opposite side of the light-incident part 51 (see FIGS. 1, 3, and 4). In this case, the light emitted from the light-facing part 53 is reflected from the bottom portion of an upper-side member 130, and then is incident to the light-facing part 53 again. The light incident to the light-facing part 53 of the light guide plate is emitted from the light-emitting surface 50a of the light guide plate, and then is mostly emitted toward the upper side of the display panel 90 while being partly emitted to the light-facing part 53 and left and right side surfaces 55 and 57 of the light guide plate. The light reflective structure of the upper-side member 130 reflecting the light emitted from the light-facing part 53 will be described later.

The light emitted from the left side surface 55 of the light guide plate is guided by the left-side member 150 of the holder 100 to be emitted mainly to the left side of the display panel 90, and the light emitted from the right side surface 57 of the light guide plate is guided by the right-side member 170 of the holder 100 to be radiated mainly to the right side of the display panel 90.

In addition, the size of the light guide plate 50 may be smaller than the size of the display panel 90. Specifically, the surface of the light guide plate 50 may be smaller than the surface of the display panel 90. Accordingly, the manufacturing process of the display device 1 can be simplified and the manufacturing costs could decrease.

However, since the size of the light guide plate 50 is smaller than the size of the display panel 90, there may be a problem that light at the edge of the display panel 90 is reduced as the light provided from the light module 60 passes through the light guide plate 50. This problem and others can be solved, e.g., through the structure of the holder 100 in an embodiment which will be described below.

The light module 60 may include a band-shaped board 61 formed narrow and long along the light-incident part 51 of the light guide plate, and a plurality of LEDs 63 arranged on one surface of the board and spaced apart from the board.

The holder 100 may include a lower-side member 110, an upper-side member 130, a left-side member 150, and a right-side member 170 respectively fixed to a lower-side edge, an upper-side edge, a left-side edge, and a right-side edge.

Figure 5:
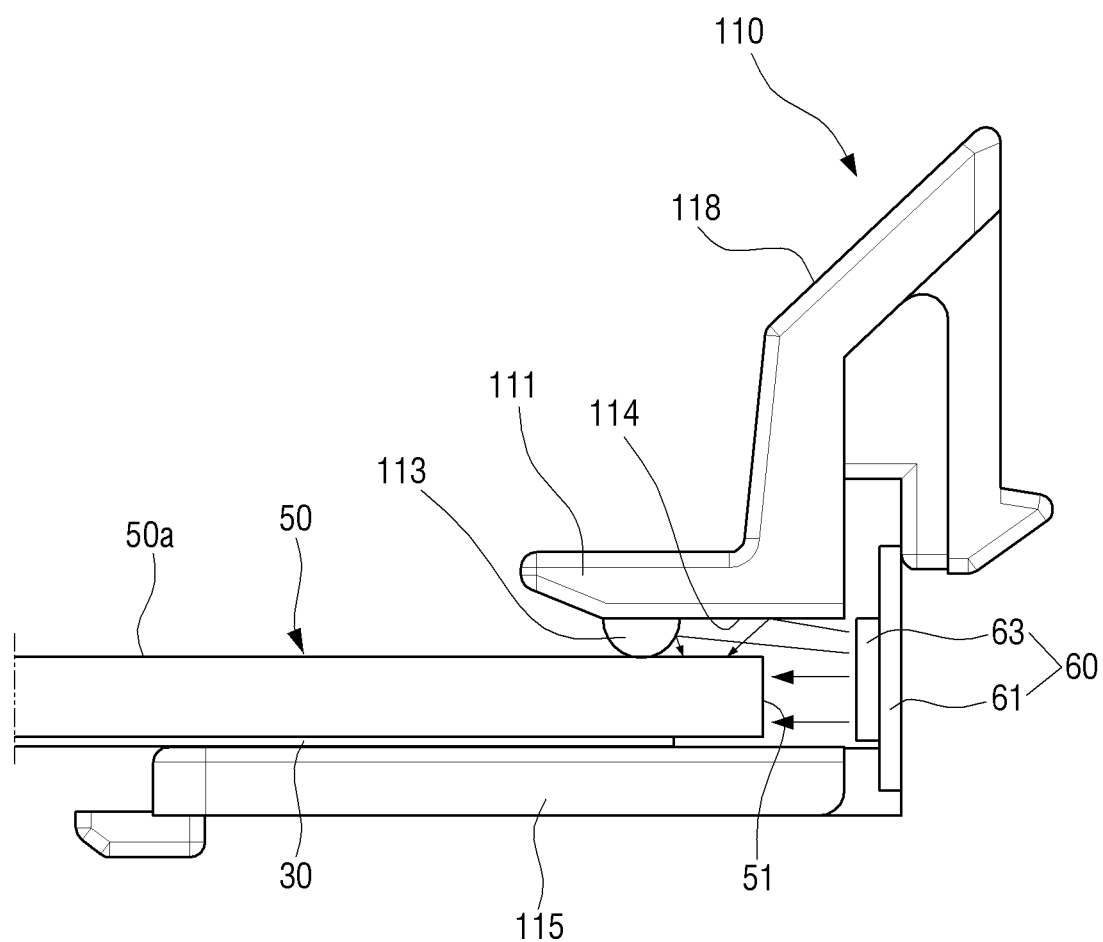
FIG. 5 is a partially cut-away cross-sectional view illustrating an example in which a light blocking protrusion is formed on a lower-side member.

The light module 60 may be supported on the inside of the lower-side member 110. In this case, as shown in FIG. 5, the light module 60 is hidden by the lower-side member 110 and is not exposed to an outside. The lower-side member 110 may support the light guide plate 50 and the reflective sheet 30.

The upper-side member 130, the left-side member 150, and the right-side member 170 may be coupled to the back chassis 10 in a separable manner by a normal coupling structure, for example, a hook coupling structure. Further, the upper-side member 130, the left-side member 150, and the right-side member 170 respectively support parts of the light-emitting surface 50a of the light guide plate and a part of the rear surface of the display panel 90 at the same time.

Hereinafter, referring to FIGS. 3 and 4, the structure of the upper-side member 130 of the holder 100 will be described in detail.

FIG. 3 is a partially cut-away cross-sectional view illustrating an example in which light emitted from a light-facing part of a light guide plate is reflected from first and second reflecting surfaces formed on a bottom portion of an upper-side member and then is again incident to the light-facing part of the light guide plate, and FIG. 4 is a partially cut-away perspective view illustrating an example in which an upper-side member is hook-coupled to a back chassis.

Referring to FIG. 3, the upper-side member 130 of the holder 100 includes a light guide surface 131 formed on the front surface of the upper-side member 130 to be inclined along the length direction of the upper-side member 130, and a seat surface 133, on which an upper-side portion of the rear surface of the display panel 90 is seated, formed at the uppermost end of the upper-side member 130 adjacent to the light guide surface 131 along the length direction of the upper-side member 130.

The upper-side member 130 may support the light guide plate 50 in a manner that a bottom end portion 135 of the upper-side member 130 projects toward the light guide plate 50 to cover a part of the light-emitting surface 50a of the light guide plate.

The upper-side member 130 is formed of a light reflective material so as to reflect the light emitted through the light-facing part 53 of the light guide plate back to the inside of the light guide plate 50 to improve light efficiency of the light guide plate. For example, the upper-side member 130 may be made of an opaque synthetic resin material or a synthetic resin material having specific transparency. In this case, the material of the upper-side member 130 may have specific elasticity.

The reflective structure of the upper-side member 130 may include first and second light reflecting surfaces (i.e., first and second reflective surfaces) 137a and 137b formed on the bottom portion of the upper-side member 130 adjacent to the light-facing part 53 of the light guide plate as illustrated in FIG. 3.

The first and second light reflecting surfaces 137a and 137b may be formed by cutting the bottom portion of the upper-side member 130 roughly in "¬" shape. Further, the first and second light reflecting surfaces 137a and 137b may be formed during injection molding of the upper-side member 130.

The first light reflecting surface 137a may be disposed to be spaced apart from the light-facing part 53 of the light guide plate by a specific distance to face the light-facing part 53. The first light reflecting surface 137a may directly reflect the light emitted from the light-facing part 53 of the light guide plate back toward the light-facing part 53.

The second light reflecting surface 137b may be disposed on one side of the first light reflecting surface 137a roughly at right angles. The second light reflecting surface 137b may reflect the light reflected by the first light reflecting surface 137a toward the light-facing part 53, and may reflect the light emitted from the light-facing part 53 to the first light reflecting surface 137a.

Further, if the reflective sheet 30 is formed to extend so that it projects from the light-facing part 53 of the light guide plate, an extension part 31 of the reflective sheet 30 is disposed roughly to face the second light reflecting surface 137b. In this case, in the same manner as the second light reflecting surface 137b, the extension part 31 of the reflective sheet 30 may reflect the light reflected by the first light reflecting surface 137a toward the light-facing part 53, and may reflect the light emitted from the light-facing part 53 to the first light reflecting surface 137a.

As described above, the light emitted from the light-facing part 53 of the light guide plate may be reflected by the first and second reflecting surfaces 137a and 137b and the extension part 31 of the reflective sheet, and may be incident upon the light-facing part 53 of the light guide plate.

The reflectivity of the reflective structure of the upper-side member 130 may be managed to maintain about 90% or more of the light emitted from the light-facing part 53 of the light guide plate, and thus a light loss can be minimized.

On the other hand, by minimizing the spacing between the bottom end portion 135 of the upper-side member 130 and the light-emitting surface 50a of the light guide plate, the amount of light bouncing on the light-facing part 53 of the light guide plate can be minimized. In this case, it is necessary to design the spacing between the bottom end portion 135 of the upper-side member 130 and the light-emitting surface 50a of the light guide plate in consideration of the minimum amount of thermal expansion of the light guide plate 50 expanding by heat generated during driving of the plurality of LEDs 63.

Referring to FIG. 4, the upper-side member 130 may have a plurality of hooks 139 formed on the rear surface of the upper-side member 130 at intervals. The respective hooks 139 are coupled to a plurality of coupling holes 11 formed on the back chassis 10 in a separable manner as illustrated in FIG. 4. As the upper-side member 130 is coupled to the back chassis 10 by the plurality of hooks 139, it can support the upper side of the light-emitting surface 50a of the light guide plate through the front end portion 135.

On the other hand, the display device in the related art has a problem that the light emitted from the plurality of LEDs leaks through the gap formed between the lower-side member of the holder and the light guide plate.

However, in an embodiment of the present disclosure, the light can be prevented from leaking through a light blocking protrusion 113 of the lower-side member 110 as illustrated in FIG. 5.

FIG. 5 is a partially cut-away cross-sectional view illustrating an example in which a light blocking protrusion is formed on a lower-side member.

Referring to FIG. 5, the front end portion 111 of the lower-side member 110 is formed to face and to be spaced apart from the light-emitting surface 50a of the light guide plate, and a rear end portion 115 thereof supports the light guide plate 50 and the reflective sheet 30. The light module 60 is disposed on the inside of the lower-side member 110, and a light passing slot 114 is formed on the lower-side member 110 so that the light emitted from the plurality of LEDs is incident to the light-incident part 51 of the light guide plate. A light guide surface 118 is formed on the front surface of the lower-side member 110 to be inclined along the length direction of the lower-side member 110.

The light blocking protrusion 113 is integrally formed on the rear surface of the front end portion 111 of the lower-side member to project toward the light-emitting surface 50a of the light guide plate along the length direction of the lower-side member 110.

The light blocking protrusion 113 may come in close contact with the light-emitting surface 50a of the light guide plate. The light blocking protrusion 113 that comes in close contact with the light-emitting surface 50a of the light guide plate may be formed roughly to be convexly curved so as to prevent separation from the light-emitting surface 50a of the light guide plate. In this case, in order to improve close adhesion of the light blocking protrusion 113 to the light-emitting surface 50a of the light guide plate, the lower-side member 110 may be made of a material having specific elasticity.

As illustrated in FIG. 5, the lower-side member 110 blocks light leak between the lower-side member 110 and the light guide plate 50 through the light blocking protrusion 113. In this case, in the same manner as the upper-side member 130 as described above, the lower-side member 110 including the light blocking protrusion 113 may be made of a material having high reflectivity so that the lower-side member 110 not only blocks the light leaking but also reflects light to the light guide plate.

Accordingly, the lower-side member 110 can increase the amount of light incident to the light guide plate 50 by reflecting the light that is not directly incident to the light guide plate 50 among the light emitted from the plurality of LEDs 63 to the light guide plate 50 using the rear surface of the front end portion 111 and the light blocking protrusion 113. As the amount of light incident to the light guide plate 50 increases, the luminance of the display panel can be increased, and through this, power consumption of the display device can be reduced.

As described above, in an embodiment of the present disclosure, the first and second reflecting surfaces are formed on the upper-side member to reflect light back toward the light-facing part 53. Thus, side tape that is attached to the light-facing part of the light guide plate in the related art can be omitted, and material costs can be saved. Further, since the side tape attachment process can be omitted, the yield rate can be improved, and the manufacturing costs can be saved through the manufacturing time reduction caused by the process omission. In addition, inferiority that may occur due to melting of the adhesives of the side tape can be avoided.

From the foregoing, although preferred embodiments of the present disclosure have been illustrated and described, the present disclosure is not limited to the above-described specific embodiments, but various modifications will be apparent to those of ordinary skill in the art to which the present disclosure pertains without departing from the gist of the present disclosure as appended in claims. Further, such modified embodiments should not be understood separately from the technical idea or prospect of the present disclosure.

What is claimed is:

1. A display device comprising:
    a display panel;
    a light guide plate disposed in a rear of the display panel to be spaced apart from the display panel;
    a light source disposed adjacent to a light-incident surface of the light guide plate and configured to radiate light toward the light-incident surface of the light guide plate; and
    a holder disposed along a light-facing surface of the light guide plate, the light-facing surface of the light guide plate opposing the light-incident surface of the light guide plate, the holder comprising a supporting portion that supports a light-emitting surface of the light guide plate, the light-emitting surface of the light guide plate disposed between the light-incident surface and the light-facing surface; and
    a reflective sheet disposed in rear of the light guide plate,
    wherein the supporting portion of the holder comprises a first light reflecting surface that faces the light-facing surface of the light guide plate, and
    wherein light exiting the light-facing surface of the light guide plate is reflected by the reflective sheet and the first light reflecting surface and reenters the light guide plate at the light-facing surface.

2. The display device as claimed in claim 1, wherein the supporting portion of the holder further comprises a second light reflecting surface that faces the light-emitting surface of the light guide plate.

3. The display device as claimed in claim 1, wherein the supporting portion of the holder comprises a first light guide surface formed on a front surface of the supporting portion and configured to be inclined from a side facing the light guide plate to a side facing the display panel to guide light emitted from the light-emitting surface of the light guide plate toward the display panel.

4. The display device as claimed in claim 1, wherein the holder further comprises a second supporting portion disposed along the light-incident surface of the light guide plate and configured to support the light-emitting surface of the light guide plate,
    wherein the second supporting portion of the holder comprises a light blocking protrusion formed on a rear portion of the second supporting portion, the light blocking protrusion being configured to contact the light-emitting surface of the light guide plate.

5. The display device as claimed in claim 1, wherein a reflectivity of the first light reflecting surface is 90% or more.

6. The display device as claimed in claim 2, wherein the supporting portion of the holder is made of a light reflective material.

7. The display device as claimed in claim 4, wherein the second supporting portion of the holder is made of a material having elasticity.

8. The display device as claimed in claim 4, wherein the second supporting portion of the holder is made of a light reflective material.

9. The display device as claimed in claim 4, wherein the second supporting portion of the holder comprises a second light guide surface formed on a front surface of the second supporting portion and configured to be inclined from a side facing the light guide plate to a side facing the display panel to guide light emitted from the light-emitting surface of the light guide plate toward the display panel.

10. The display device as claimed in claim 4, wherein a surface of the light blocking protrusion is made of a light reflective material.

11. A display device comprising:
    a display panel;
    a light guide plate disposed in a rear of the display panel to be spaced apart from the display panel;
    a light source disposed adjacent to a light-incident surface of the light guide plate and configured to radiate light toward the light-incident surface of the light guide plate; and
    a holder disposed along a light-facing surface of the light guide plate, the light-facing surface of the light guide plate opposing the light-incident surface of the light guide plate, the holder comprising a supporting portion that supports a light-emitting surface of the light guide plate, the light-emitting surface of the light guide plate disposed between the light-incident surface and the light-facing surface,
    wherein the supporting portion of the holder comprises a first light reflecting surface that faces the light-facing surface of the light guide plate,
    wherein the holder further comprises a second supporting portion disposed along the light-incident surface of the light guide plate and configured to support the light-emitting surface of the light guide plate,
    wherein the second supporting portion of the holder comprises a light blocking protrusion formed on a rear portion of the second supporting portion, the light blocking protrusion being configured to contact the light-emitting surface of the light guide plate, and
    wherein the light blocking protrusion comprises a convexly curved portion formed thereon to contact the light-emitting surface of the light guide plate.

12. A display device comprising:
    a light guide plate;

a reflecting sheet provided behind the light guide plate; and a frame configured to support a front surface of the light guide plate, the frame comprising a first reflective surface opposing a side surface of the light guide plate and a second reflective surface opposing the reflecting sheet, wherein light exiting the side surface of the light guide plate is reflected by the reflecting sheet, the first reflective surface, and the second reflective surface and reenters the light guide plate at the side surface.

13. The display device as claimed in claim 12, wherein the first reflective surface is parallel to the side surface of the light guide plate, and wherein the second reflective surface is parallel to the front surface of the light guide plate.

14. The display device as claimed in claim 12, wherein a gap is formed between the side surface of the light guide plate and the first reflective surface, and wherein the reflecting sheet opposes the second reflective surface across the gap.

15. The display device as claimed in claim 12, further comprising a display panel in front of the light guide plate, wherein light exiting the front surface of the light guide plate is incident upon the display panel.

16. The display device as claimed in claim 12, further comprising a light source configured to emit light toward a second side surface of the light guide plate, the second side surface opposing the side surface.

17. The display device as claimed in claim 12, wherein a reflectivity of the first reflective surface is 90% or more and a reflectivity of the second reflective surface is 90% or more.

18. The display device as claimed in claim 13, wherein the second reflective surface contacts the front surface of the light guide plate.

* * * * *